US006687128B2

(12) United States Patent
Tokuhara

(10) Patent No.: US 6,687,128 B2
(45) Date of Patent: Feb. 3, 2004

(54) ASSOCIATIVE TYPE COMPUTERS

(76) Inventor: Tsunemi Tokuhara, c/o Cybernetics Technology Co., Ltd. Daitoh Bldg. 4F 32-1, Takada 3-chome, Toshima-ku, Tokyo (JP)

( * ) Notice: Subject to any disclaimer, the term of this patent is extended or adjusted under 35 U.S.C. 154(b) by 137 days.

(21) Appl. No.: 09/951,627

(22) Filed: Sep. 14, 2001

(65) Prior Publication Data
US 2002/0044426 A1 Apr. 18, 2002

(30) Foreign Application Priority Data
Sep. 21, 2000 (JP) .................................... 2000-286469

(51) Int. Cl.[7] ................................................ G06F 1/16
(52) U.S. Cl. .................................... 361/724; 361/683
(58) Field of Search ............................ 361/679, 683, 361/724, 729–735

(56) References Cited
U.S. PATENT DOCUMENTS

| 5,170,482 | A | * | 12/1992 | Shu et al. ..................... 712/12 |
| 5,581,709 | A | * | 12/1996 | Ito et al. ...................... 710/38 |
| 5,691,885 | A | * | 11/1997 | Ward et al. .................. 361/735 |
| 6,055,599 | A | * | 4/2000 | Han et al. ..................... 710/317 |
| 2002/0062344 | A1 | * | 5/2002 | Ylonen et al. ................ 709/204 |
| 2003/0028645 | A1 | * | 2/2003 | Romagnoli .................. 709/226 |

* cited by examiner

Primary Examiner—Lisa Lea-Edmonds
(74) Attorney, Agent, or Firm—Wenderoth, Lind & Ponack, L.L.P.

(57) ABSTRACT

An associative type computer capable of wirelessly coupling with a high density of computers of the same structure comprising a cube shaped casing surrounding elements such as CPU or memory IC 10 and input/output interface 14. Signal transmission elements 22, 24 for wirelessly coupling the input/output interface of an adjacent computer are disposed on the inside of each face of the casing. The signal transmission elements are connected to the input/output interface 14 of the inside of the casing 4, such that wireless bilateral data transmission can be carried out between the signal transmission elements 22, 24 of the other computerd through the signal transmission elements 22, 24 of the computer. The acceptance and output of the data from the other computer by the signal transmission elements 22, 24 can be carried out through a multiple switch router 16, and the signal transmission path connecting each computer can be optionally set.

10 Claims, 5 Drawing Sheets

ASSOCIATIVE TYPE COMPUTERS

BACKGROUND OF THE INVENTION

The present invention relates to an associative type computer comprising an aggregate type computer the includes a multitude of connected computers.

A multitude of connected computers are connected in a cluster to constitute an aggregate type computer. This type of computer is used as a server constituting a data center of an ASP (Application Service Provider) or is used as a supercomputer that performs a type of large scientific computation which has been conventionally carried out. The connection between each computer is generally a wired connection.

It becomes extremely inconvenient to construct an aggregate type supercomputer by connecting a multitude of computers in a cluster as an aggregate volume of the entire computer becomes large. Furthermore, an accommodating space of the entire structure has been large due to an excessively large volume of cords used to connect each computer. Moreover, connecting the operation of each computer has been extremely cumbersome and time consuming.

An object of the present invention is to solve the foregoing problems.

SUMMARY OF THE INVENTION

The present invention provides an associative type computer capable of simply and wirelessly connecting computers with computers of similar structure in high density.

In the case where computers each having elements such as a CPU or memory 1C and input/output interface and the like built in a cubic type casing, are disposed adjacent to one another on the inside of a hexahedral casing, the input/output interfaces of the adjacent computers are provided with signal transmission elements for a wireless connection. Bilateral data can be wirelessly transmitted between the signed transmission element of one computer and the signal transmission elements other computers. Acceptance and output of data from the signal transmission elements of the other computers are carried out via a multiple switch router. Further, the multiple switch router can optionally set a signal transmission path connecting each of the computers.

DETAILED DESCRIPTION OF THE INVENTION

The present invention will be described hereinafter in detail by referring to attached drawings in which a mode of embodiment of the present invention is illustrated.

Figure 1:
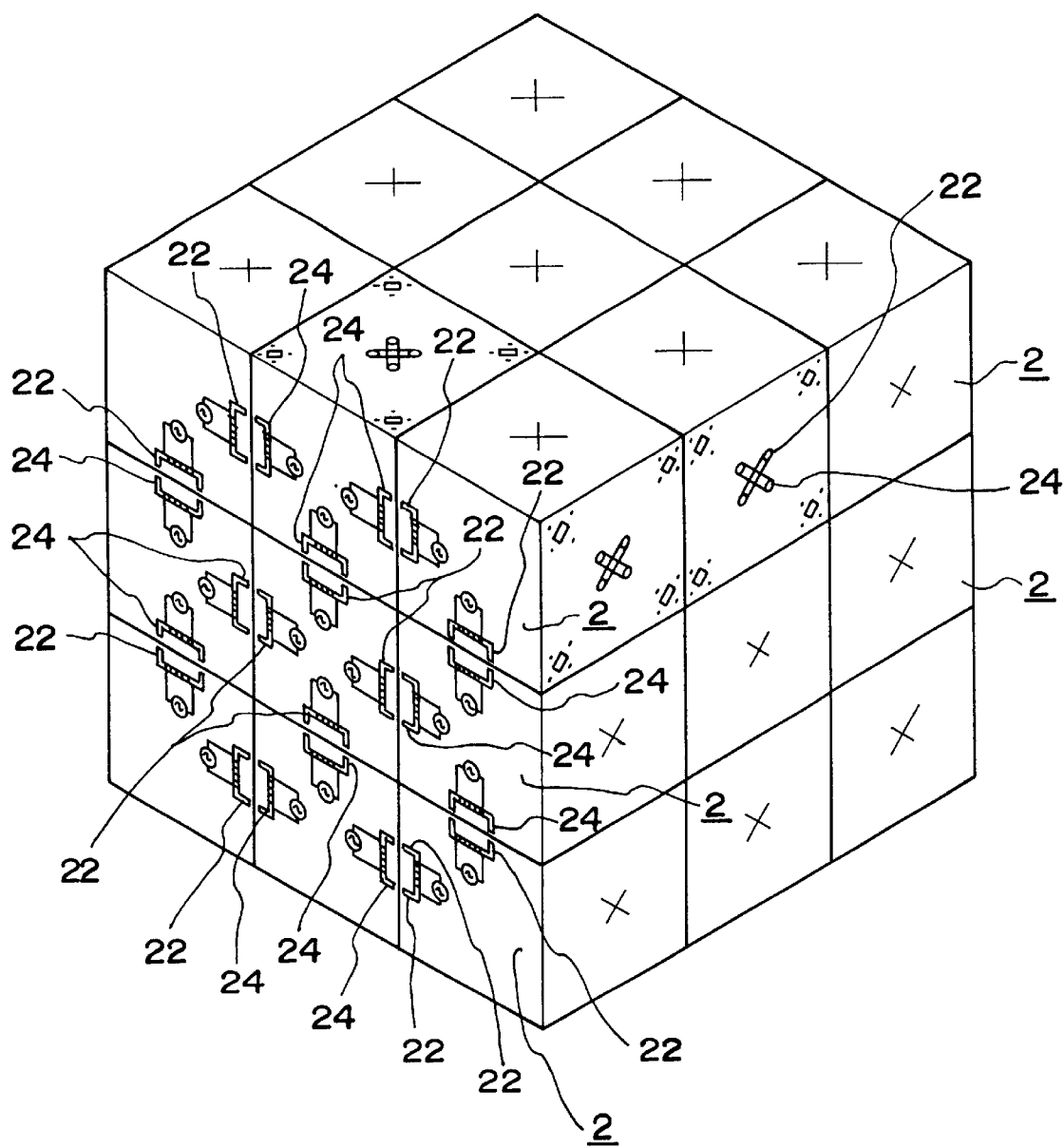
FIG. 1 denotes an explanatory exterior drawing of an associative type computer.
Figure 2:
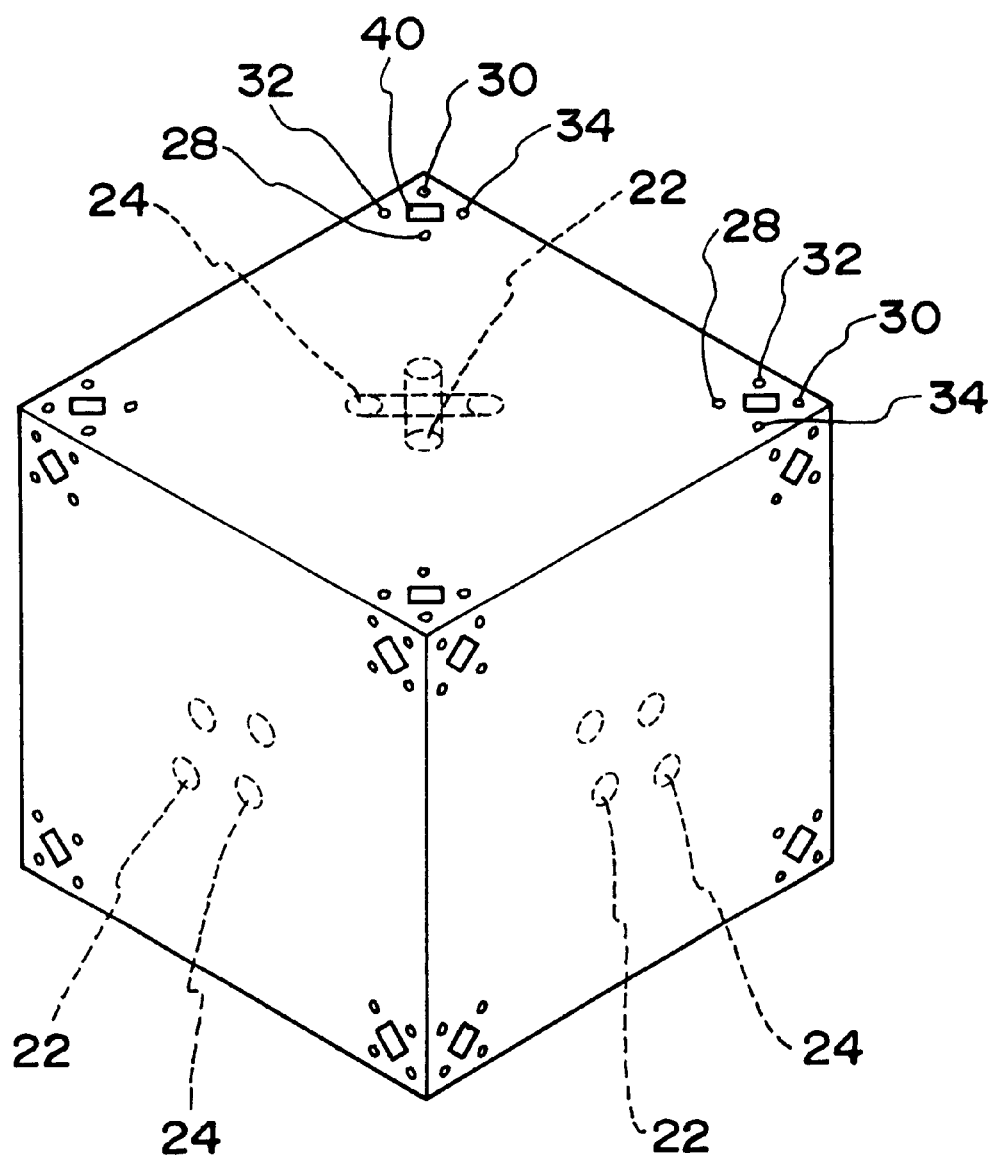
FIG. 2 denotes an explanatory exterior drawing of an aggregate type computer for constitution of the associative type computer.
Figure 3:
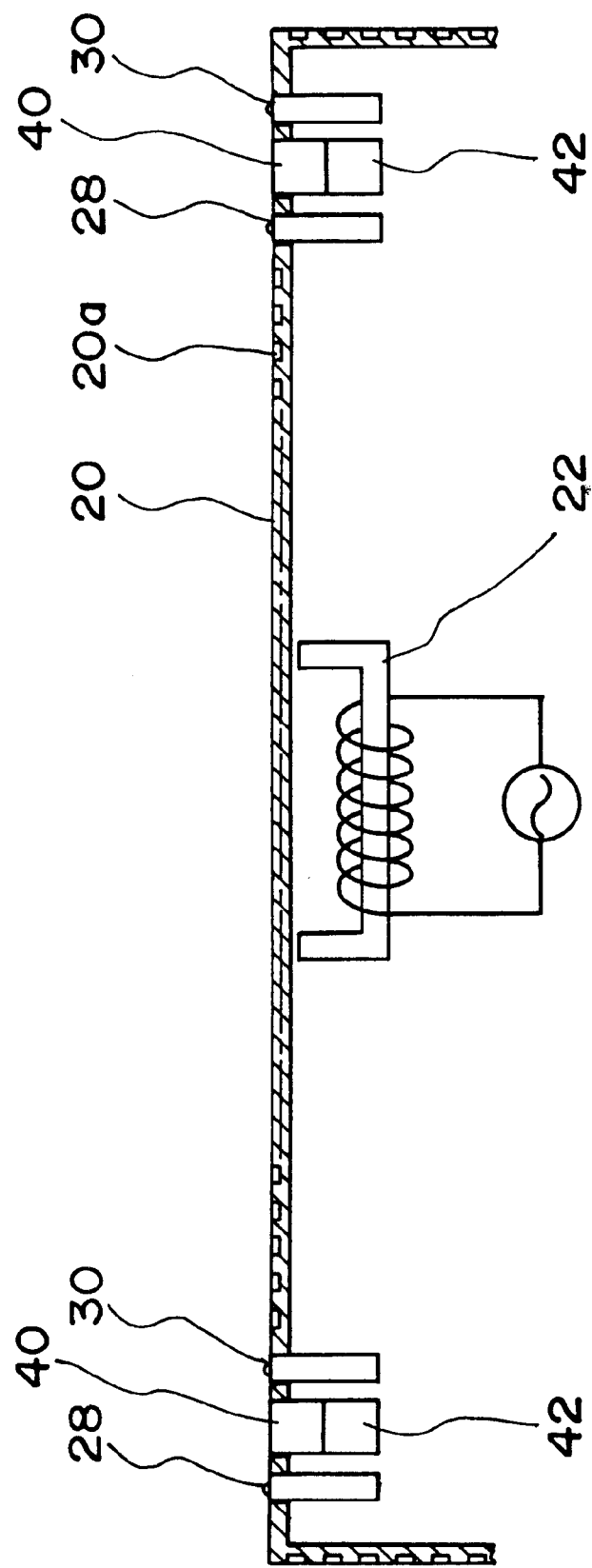
FIG. 3 denotes a cross-section of a line A—A of FIG. 2.
Figure 4:
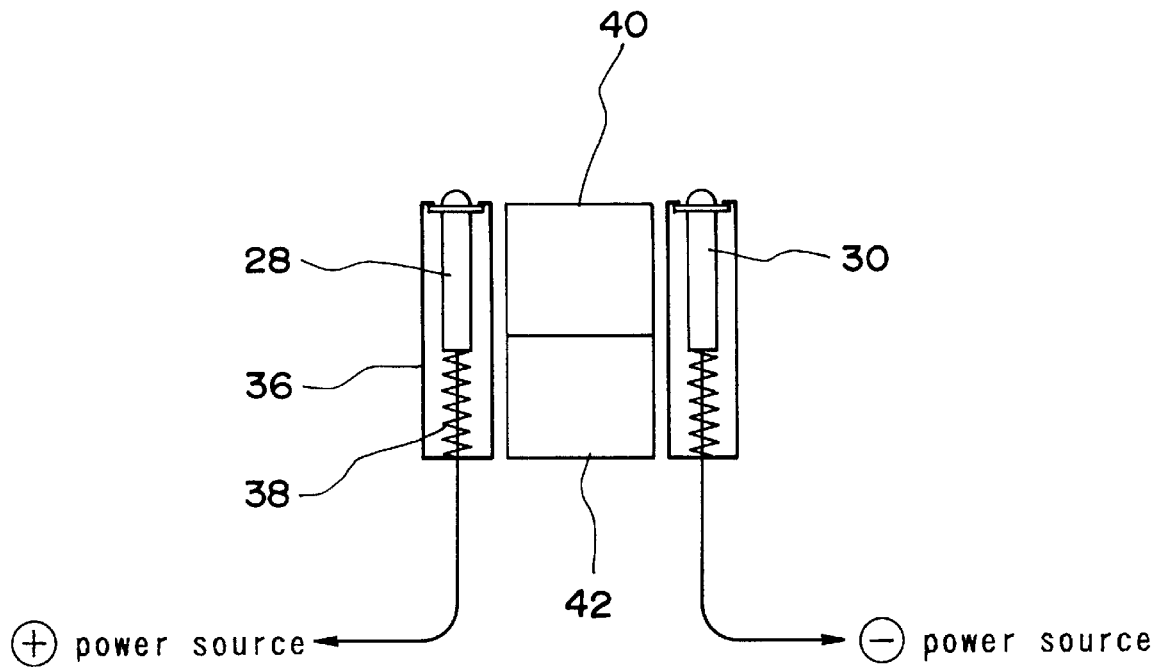
FIG. 4 denotes an explanatory drawing of a power source supply terminal bar.
Figure 5:
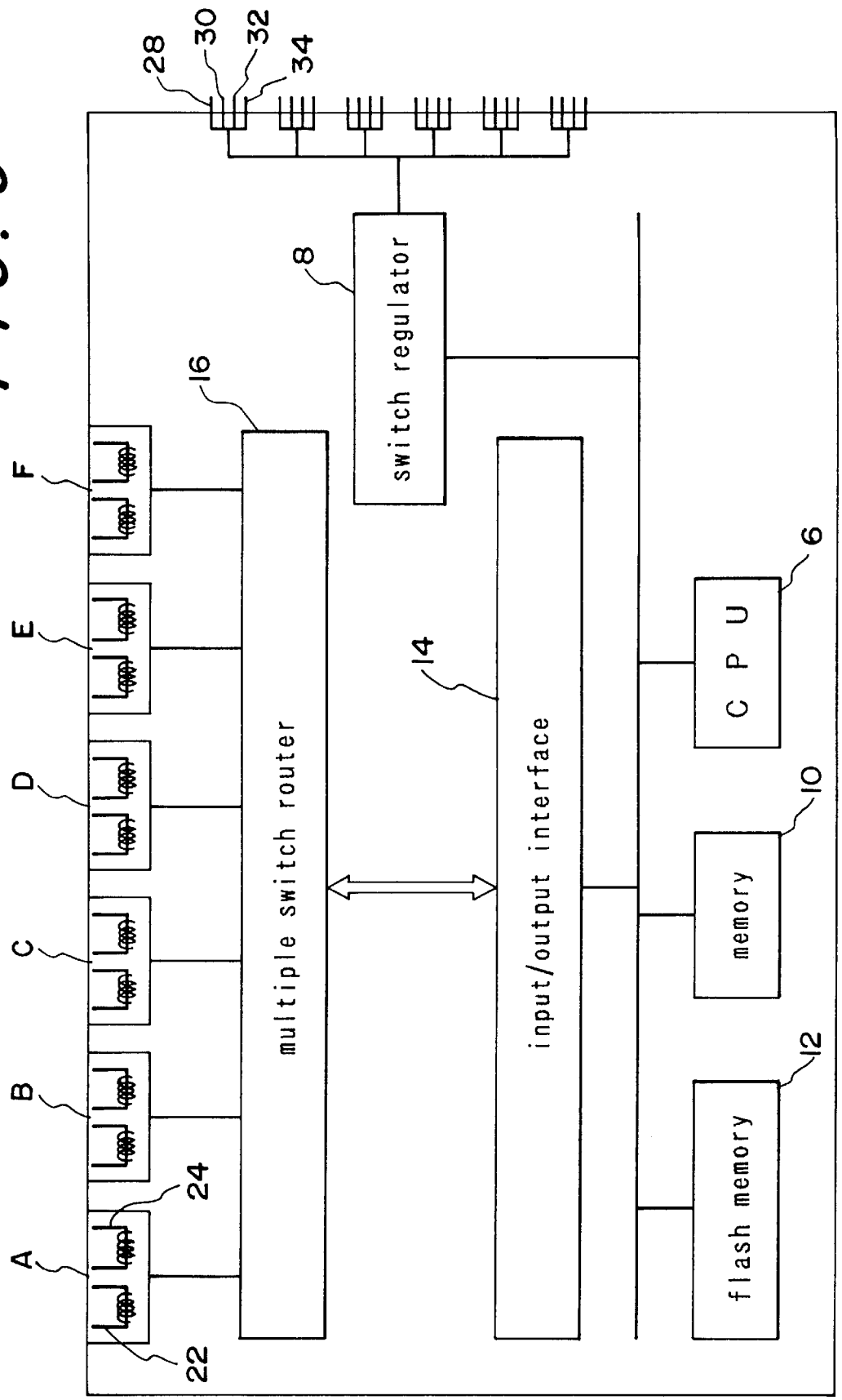
FIG. 5 denotes a function block explanatory drawing of the associative type computer.

In FIG. 1, reference numeral 2 denotes an associative type computer of sealed cubic type having a cubic appearance. As shown in FIG. 5, the associative type computer has a CPU 6, switch regulator 1C 8, a memory 1C 10, a flash memory 12, and an input/output interface 14 connected as per the drawing and built in the casing 4 made of metal having good thermal conductivity such as aluminum or copper and the like.

On the surface of each face plate 20 of the casing 4, a scale type radiation fin 20a is formed. In the center of the inside of a face plate 20, wireless signal transmission elements 22, 24 are disposed in opposition to each other thereby forming a counter electrode type electromagnetic coupling transformer. The signal transmission elements 22, 24, formed by a pair of transformers, are disposed so as to mutually intersect by forming an angle of 90 degrees. The electromagnetic surfaces of both ends of an iron core oppose, with a slight gap, the inner surface of the corresponding surface plate 20 of the casing 4.

The signal transmission elements 22, 24 disposed on each of the surfaces of the casing 4 are connected to an input/output interface 14 by means of a multiple switch router 16. The multiple switch router 16 is constructed to perform a selective acceptance, output and bypass processing of the data by discriminating a frequency or code signal. At four corners of each of the surface plate 20 of the casing 4, four pieces of terminal bars 28, 30, 32, 34 are disposed resiliently by being positioned at each angle of a square by slightly projecting from the surface plate 20 of the casing 4.

Among the four pieces of the terminal bars 29, 30, 32, 34, the two terminal bars on a diagonal constitute ground terminal bars 32, 34, and the other two pieces on the other diagonal constitute electric power supply terminal bars 28, 30. Each of the terminal bars 28, 30, 32, 34 is slidably disposed by projecting tip portions thereof in a cylinder 36 fixed to the casing 4, and are resiliently arranged in a projecting direction by means of a spring 38.

An iron piece 40 is disposed at an intermediate position of a square space in which the four pieces of the terminal bars 28, 30, 32, 34 are disposed, and a permanent magnet is fixed to the iron piece 40. The tip of the iron piece 40 is disposed on an almost identical plane with the surface of the face plate 20 of the casing 4, and the iron piece 40 and the permanent magnet 42 are fixed to the casing 4. A positioning mechanism (illustration is omitted) is provided on each of the surfaces of the casing 4 which consists of a structure of prior art so that mutual adjacent surfaces are perfectly coincided when the casing 4 is superimposed on the other casing 4.

In the foregoing construction, when a plurality of the computers 2 of the similar structure as shown in FIG. 1 are disposed adjacent to each other, the computers 2 are physically coupled by the magnetic force of the iron piece 40, which form a cubic shape as a whole, and the signal transmission elements 22, 24 of each of the surfaces of the computer 2 are opposed to the signal transmission elements 22, 24 of the other adjacent computer 2, and both the adjacent computers 2 are mutually and electromagnetically coupled.

In case a plurality of computers 2 are disposed adjacent to each other in a face to face relationship, the electric power terminal bars 28, 30 mutually come to contact and the ground terminal bars 32, 24 mutually come to contact, and an internal circuit of the adjacent computers 2 is grounded through the ground terminal bars 32, 34, and the electric power is supplied to each of the adjacent computers 2 through the electric supply terminal bars 28, 30.

The heat generated at the time of drive of each of the computers 2 is radiated through the fin 20a formed on the surface plate 20 of the casing 4. A critical temperature is set on each of the computers 2, and when a temperature of each of the computers 2 exceeds the critical temperature, it is detected by a sensor built in each of the computers 2, and a required overheat prevention operation is carried out by the CPU 6.

The fluid such as water, air, oil and the like flows on the adjacent surfaces of the casing 4 of the adjacent computers 2 at a proper velocity, and each of the computers 2 is cooled with the fluid. Also, in case the temperature rise of each of the computers 2 is excessive, each of the computers 2 is permanently stopped by a temperature fuse built therein.

In case the hexahedron of the computer 2 is electromagnetically coupled with the adjacent computer 2, the multiple switch router 16 operates as a switch gate that performs a selection of whether or not the conduction or interruption of the data is made, and a selection of the data transmission path is made by using frequency, time and sign.

In FIG. 5, when the input/ouput ports consisting of the signal transmission elements 22, 24 disposed on the hexahedron of the casing 4 are made as A, B, C, D, E, F, a frequency band for each port A, B, C, D, E, F of the multiple switch router 16 is set at a predetermined value, an optional port, for example, A, B, C, and D can be open, and an optional port, for example, E, F can be closed. The acceptance or output of the data from the closed ports, E, F can be prevented which corresponds to a set frequency band.

Furthermore, a side line, namely, by-pass can be formed between optional ports by means of the multiple switch router 16. When a required by-pass set control signal is used as input to the multiple switch router 16, for example, the by-pass is formed between the ports A and F, and the data transferred to the port A is not accepted by the input/output interface 14 and is transferred to the port F through the by-pass. As described above, the selection of the signal transmission path can be carried out by the computer 2 itself, and there is no need of preparing the special signal transmission path control device.

In the foregoing embodiment, the electromagnetic transformer is used as the signal transmission elements 22, 24 of cordless type, but when the computers 2 are in adjacent condition, the coupling of the transmission path of the signal on the adjacent surface is not particularly limited to the electromagnetic coupling and as the signal transmission element, an antenna may be used to provide an electromagnetic wave coupling by the antenna. Furthermore, when as the signal transmission element, a conductor is used, and the computers 2 are in adjacent condition, an electron coupling may be formed by the mutual contact of the conductors on the adjacent surfaces. Besides, as the signal transmission element, a field coupling element, photocoupling element and the like may be used.

In accordance to the present invention as described in the foregoing, a magnitude of computers can be disposed in high density coupling in a compact space, and moreover, a wireless device can be materialized.

What is claimed is:

1. An associative computer system comprising:

a first computer structure comprising a first polyhedron shaped casing, a first CPU and a first wireless transmission element, said first polyhedron shaped casing surrounding said first CPU and said first wireless transmission element, said first wireless transmission element being operable to communicate a first input signal to said first CPU and to transmit a first output signal from said first CPU; and a second computer structure comprising second polyhedron shaped casing, a second CPU and a second wireless transmission element, said second polyhedron shaped casing surrounding said second CPU and said second wireless transmission element, said second wireless transmission element being operable to communicate a second input signal to said second CPU and to transmit a second output signal from said second CPU; and a multiple switch router, wherein said first computer structure is disposed adjacent to said second computer structure such that said first computer structure is operable to bilaterally communicate with said second computer structure via wireless data transmissions between said first wireless transmission element and said second wireless transmission element, and wherein said multiple switch router is operable to enable said first computer structure to receive the second output signal from said second wireless transmission element as the first input signal and to enable said second computer structure to receive the first output signal from said first wireless transmission element as the second input signal.

2. The associative computer system according to claim 1, wherein said first polyhedron shaped casing is cubic, wherein said second polyhedron shaped casing is cubic, wherein said first wireless transmission element is disposed in the center of said first polyhedron shaped casing, and wherein said second wireless transmission element is disposed in the center of said second polyhedron shaped casing.

3. The associative computer system according to claim 2, wherein said first computer structure further comprises an electric power supply terminal having a portion projecting externally from said first polyhedron shaped casing, said electric power supply terminal being operable to supply electric power from an external source to said first CPU.

4. The associative computer system according to claim 3, wherein said electric power supply terminal comprises a terminal bar having a tip, wherein said tip projects externally from said first polyhedron shaped casing.

5. The associative computer system according to claim 2, further comprising a magnet operable to adhere said first polyhedron shaped casing to said second polyhedron shaped casing.

6. The associative computer system according to claim 1, wherein said first computer structure further comprises an electric power supply terminal having a portion projecting externally from said first polyhedron shaped casing, said electric power supply terminal being operable to supply electric power from an external source to said first CPU.

7. The associative computer S stem according to claim 6, wherein said electric power supply terminal comprises a terminal bar having a tip, wherein said tip projects externally from said first polyhedron shaped casing.

8. The associative computer system according to claim 1, further comprising a magnet operable to adhere said first polyhedron shaped casing to said second polyhedron shaped casing.

9. The associative computer system according to claim 1, wherein said first computer structure further comprises a first memory and a first input/output interface, and wherein said second computer structure further comprises a second memory and a second input/output interface.

10. The associative computer system according to claim 9, wherein said first memory comprises a first integrated circuit, and wherein said second memory comprises a second integrated circuit.

* * * * *